(12) United States Patent
Sadamitsu et al.

(10) Patent No.: US 11,732,627 B2
(45) Date of Patent: Aug. 22, 2023

(54) ELECTRICALLY HEATED CATALYTIC DEVICE AND METHOD FOR MANUFACTURING ELECTRICALLY HEATED CATALYTIC DEVICE

(71) Applicants: TOYOTA JIDOSHA KABUSHIKI KAISHA, Aichi-ken (JP); NGK INSULATORS, LTD., Aichi-ken (JP)

(72) Inventors: Takahiro Sadamitsu, Miyoshi (JP); Shingo Iwasaki, Nagoya (JP)

(73) Assignees: TOYOTA JIDOSHA KABUSHIKI KAISHA, Aichi-Ken (JP); NGK INSULATORS, LTD., Aichi-Ken (JP)

( * ) Notice: Subject to any disclaimer, the term of this patent is extended or adjusted under 35 U.S.C. 154(b) by 0 days.

(21) Appl. No.: 17/694,686

(22) Filed: Mar. 15, 2022

(65) Prior Publication Data

US 2022/0298945 A1    Sep. 22, 2022

(30) Foreign Application Priority Data

Mar. 18, 2021  (JP) .................................. 2021-044800

(51) Int. Cl.
*F01N 3/20* (2006.01)
*B01D 53/94* (2006.01)
(52) U.S. Cl.
CPC .......... *F01N 3/2026* (2013.01); *B01D 53/94* (2013.01)

(58) Field of Classification Search
CPC ... H05B 3/10; F01N 2330/06; F01N 2260/10; F01N 3/0222; F01N 3/027; F01N 2240/04; F01N 3/2026; F01N 2330/30; F01N 3/24; B01D 46/24495
See application file for complete search history.

(56) References Cited

U.S. PATENT DOCUMENTS

2014/0291315 A1  10/2014  Mase et al.
2016/0215667 A1   7/2016  Omiya et al.

FOREIGN PATENT DOCUMENTS

JP      2014198296 A    10/2014
WO    2015/053133 A1    4/2015

*Primary Examiner* — Anthony Ayala Delgado
(74) *Attorney, Agent, or Firm* — Hauptman Ham, LLP

(57) ABSTRACT

An electrically heated catalytic device is provided. The electrically heated catalytic device includes a cylindrical catalyst carrier. Two electrode units are attached to a side surface of the catalyst carrier. The side surface of the catalyst carrier includes slits each extending in an axial direction of the catalyst carrier. Each slit is filled with a filler that has a lower Young's modulus than the catalyst carrier. An average Young's modulus is a value obtained by averaging the Young's modulus of the filler at different portions of the slit over an entire length of the slit in the axial direction. The slits include a first slit and a second slit. The average Young's modulus of the first slit is a first value. The average Young's modulus of the second slit is a second value that is smaller than the first value.

6 Claims, 6 Drawing Sheets

ELECTRICALLY HEATED CATALYTIC DEVICE AND METHOD FOR MANUFACTURING ELECTRICALLY HEATED CATALYTIC DEVICE

RELATED APPLICATIONS

The present application claims priority of Japanese Application Number 2021-044800 filed on Mar. 18, 2021, the disclosure of which is hereby incorporated by reference herein in its entirety.

BACKGROUND

1. Field

The present disclosure relates to an electrically heated catalytic device. The present disclosure also relates to a method for manufacturing the electrically heated catalytic device.

2. Description of Related Art

Japanese Laid-Open Patent Publication No. 2014-198296 discloses a known example of an electrically heated catalytic device as a catalytic device used to purify exhaust gas as in an internal combustion engine or the like. The electrically heated catalytic device disclosed in the literature includes a cylindrical catalyst carrier having a honeycomb structure. Two electrode units are attached to the side surface (outer circumferential surface) of the catalyst carrier. By applying voltage to a section between the electrode units so as to energize the catalyst carrier, the catalyst carrier is electrically heated.

In the electrically heated catalytic device of the literature, the side surface of the catalyst carrier includes slits. The slits are each filled with a filler.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An electrically heated catalytic device according to an aspect of the present disclosure includes a cylindrical catalyst carrier. Two electrode units are attached to a side surface of the catalyst carrier. The side surface of the catalyst carrier includes slits each extending in an axial direction of the catalyst carrier. Each of the slits is filled with a filler that has a lower Young's modulus than the catalyst carrier. An average Young's modulus is a value obtained by averaging the Young's modulus of the filler at different portions of the slit over an entire length of the slit in the axial direction. The slits include a first slit and a second slit. The average Young's modulus of the first slit being a first value. The average Young's modulus of the second slit being a second value that is smaller than the first value.

When the catalyst carrier thermally expands, a compression stress is applied to a filler in a slit. The distortion of the filler relative to the compression stress permits an outer circumferential portion of the catalyst carrier to thermally expand in the circumferential direction. The larger the permitted amount of the thermal expansion in the catalyst carrier, the smaller the amount of the heat stress of the catalyst carrier. In other words, as the permitted amount of the thermal expansion in the catalyst carrier increases, the amount of the heat stress of the catalyst carrier becomes much lower. The decrease amount of the heat stress in the catalyst carrier is determined by how easily the filler is distorted relative to the compression stress, that is, by the Young's modulus of the filler. In some cases, the Young's modulus of a filler is not fixed over the entire length of a slit. In consideration of these cases, the decrease amount of the heat stress is determined by the above-described average Young's modulus. More specifically, a slit filled with a filler having a low average Young's modulus provides a greater effect of mitigating the heat stress of the catalyst carrier than a slit filled with a filler having a high average Young's modulus. However, if a slit is filled with a filler such that the average Young's modulus decreases, the entire catalyst carrier has a decreased rigidity. Further, if a slit is filled with a filler such that the average Young's modulus decreases, a larger amount of unpurified exhaust gas may flow out of the electrically heated catalytic device through the slit.

The heat stress occurring in the catalyst carrier varies at each portion of the catalyst carrier in the temperature distribution and the rigidity distribution in the catalyst carrier. The temperature distribution in the catalyst carrier may be caused by the flow rate of exhaust gas flowing inside the catalyst carrier while the internal combustion engine is running or by the variations in the temperature between the portions of the catalyst carrier. During electrical heating, the temperature distribution in the catalyst carrier is also caused by the variations in the amount of heat generated by the catalyst carrier between the portions of the catalyst carrier. Thus, during the electrical heating, the heat stress tends to vary to a large extent between the portions of the catalyst carrier.

In one case, all of slits are each filled with a filler such that the average Young's modulus of the slits is a uniform value. In this case, the average Young's modulus of all of the slits needs to be reduced such that the value of the heat stress becomes an allowable value or smaller even at a portion where the heat stress is the maximum.

The electrically heated catalytic device having the above-described structure includes slits each having a different average Young's modulus. This allows a slit filled with a filler to be properly arranged in correspondence with the magnitude of the heat stress occurring in each portion. For example, a slit for a portion where a large heat stress occurs is a second slit having a low average Young's modulus. In contrast, a slit for a portion where a large heat stress does not easily occur is a first slit having a high average Young's modulus.

In one case, the side surface of the catalyst carrier includes slits that are each filled with a filler having a lower Young's modulus than the catalyst carrier. These slits and the filler mitigate the heat stress occurring in the catalyst carrier during electrical heating. It may be possible to set the slit located immediately below an electrode unit to be deeper than another slit so as to increase the thermal shock resistance of the catalyst carrier during energization.

The temperature distribution of the catalyst carrier during electrical heating is not uniform. Thus, the heat stress occurring in the temperature distribution varies between the portions of the catalyst carrier. The deeper a slit, the larger the heat stress that can be mitigated. However, as the slit becomes deeper, the rigidity of the catalyst carrier may become lower and the exhaust gas purification area may become lower. Thus, the depth of the slit can be increased by a limited amount. The catalyst carrier includes a portion that has a higher temperature than another portion even by increasing the depth of the slit. At such a portion, the heat stress may not be able to be sufficiently mitigated. Such a risk is reduced by the above-described structure.

The first slit and the second slit are formed, for example, as follows. The second slit has a lower average Young's modulus than the first slit. That is, the length of a portion of the first slit that is filled with the filler is greater than the length of a portion of the second slit that is filled with the filler. Alternatively, the average Young's modulus of the second slit can be set to be lower than the average Young's modulus of the first slit by filling the second slit with a filler that has a lower Young's modulus than a filler with which the first slit is filled. In the case of using a sintered body as a filler, the Young's modulus of the filler is adjusted by changing the porosity of the sintered body. Thus, in this case, the second slit is filled with a filler that has a greater porosity than a filler with which the first slit is filled.

In the structures of many electrically heated catalytic devices, two electrode units are arranged at the positions of the catalyst carrier that are opposite from each other with respect to the center axis. In such electrically heated catalytic devices, the portion of the catalyst carrier that receives a larger heat stress than another portion of the catalyst carrier during electrical heating may be a portion in the vicinity of the end of each electrode unit in the circumferential direction of the catalyst carrier. In such a case, the electrode units each include an end in the circumferential direction of the catalyst carrier. The second slit may be located in the vicinity of the end of each electrode unit in the circumferential direction of the catalyst carrier.

Another aspect of the present disclosure provides a method for the electrically heated catalytic device. The method includes preparing a cylindrical catalyst carrier. The method includes forming slits on a side surface of the catalyst carrier. The slits each extend in an axial direction of the catalyst carrier. The method includes filling each of the slits with a filler that has a lower Young's modulus than the catalyst carrier. An average Young's modulus is a value obtained by averaging the Young's modulus of the filler at different portions of the slit over an entire length of the slit in the axial direction. The method includes attaching two electrode units to the side surface of the catalyst carrier. Filling each of the slits with the filler includes filling a first slit of the slits with a filler such that the average Young's modulus is a first value and filling a second slit of the slits with a filler such that the average Young's modulus is a second value. The second value is smaller than the first value.

Other features and aspects will be apparent from the following detailed description, the drawings, and the claims.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

An electrically heated catalytic device 10 according to a first embodiment will now be described in detail with reference to FIGS. 1 to 4. The electrically heated catalytic device 10 of the present embodiment is disposed in an exhaust passage of an internal combustion engine for a vehicle or the like in order to purify exhaust gas in the internal combustion engine.

Structure of Electrically Heated Catalytic Device 10

Figure 1:
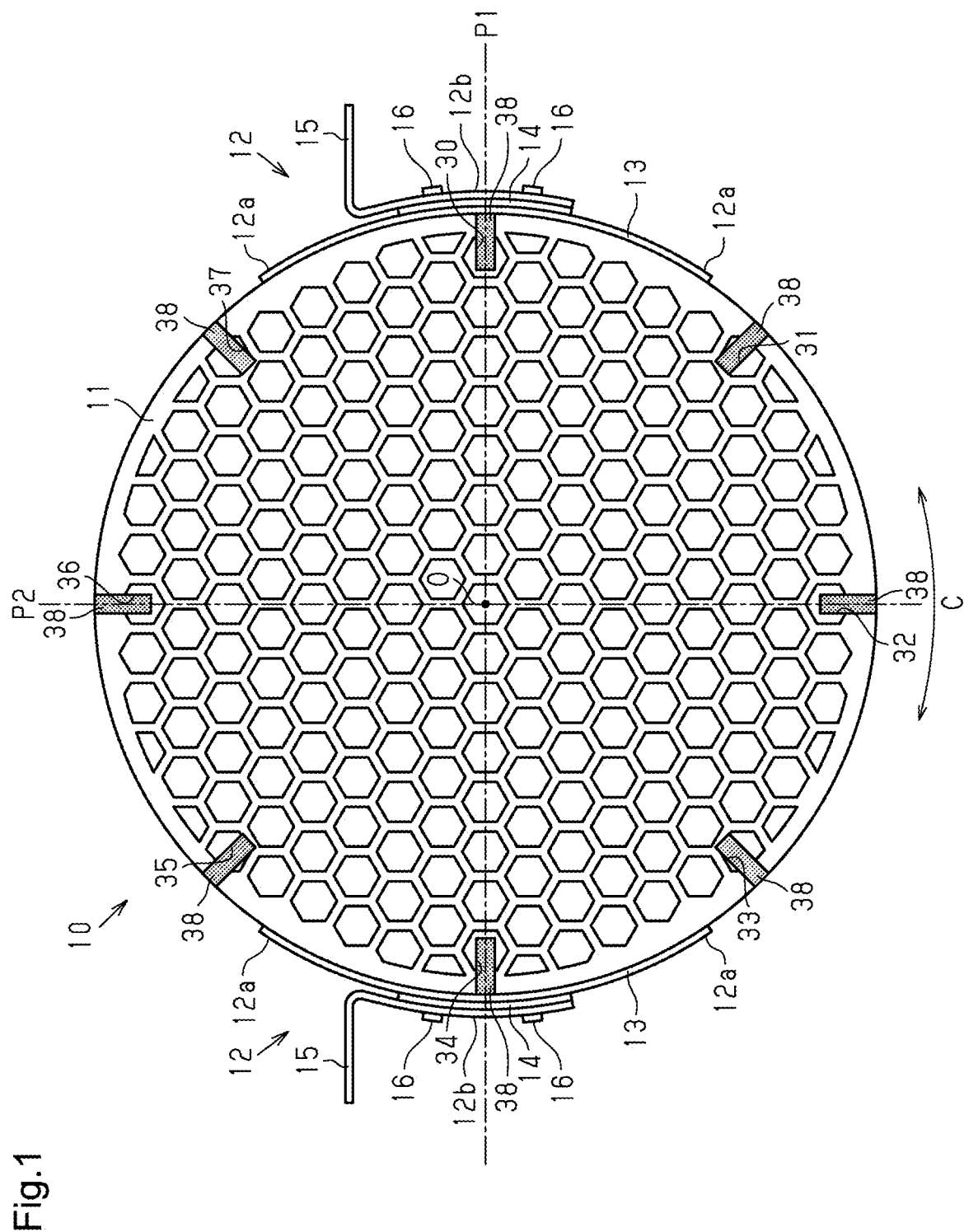
FIG. 1 is a front view of an electrically heated catalytic device according to a first embodiment.

First, the structure of the electrically heated catalytic device 10 will be described with reference to FIGS. 1 and 2. The electrically heated catalytic device 10 includes a cylindrical catalyst carrier 11. The catalyst carrier 11, which is cylindrical, has a central axis O. The direction that is parallel to the central axis O is hereinafter referred to as the axial direction A of the catalyst carrier 11. The direction around the central axis O is hereinafter referred to as the circumferential direction C of the catalyst carrier 11.

The catalyst carrier 11 has a monolithic structure including a large number of cell holes each extending through the catalyst carrier 11 in the axial direction A. The catalyst carrier 11 is a sintered body in which the main component is, for example, silicon or silicon carbide. A metal catalyst such as platinum, palladium, or rhodium is supported on the wall surface of each cell hole of the catalyst carrier 11. The left end of the catalyst carrier 11 in FIG. 2 is hereinafter referred to as the front end 11a of the catalyst carrier 11. Further, the right end of the catalyst carrier 11 in FIG. 2 is hereinafter referred to as the rear end 11b of the catalyst carrier 11.

The side surface of the catalyst carrier 11, namely, the outer circumferential surface of the catalyst carrier 11 includes two electrode units 12. The electrode units 12 are arranged at positions of the side surface of the catalyst carrier 11 that are opposite from each other with respect to the central axis O. Each electrode unit 12 includes a first underlayer 13, a second underlayer 14, a metal electrode plate 15, and a fixing layer 16. The first underlayer 13 is in contact with the side surface (outer circumferential surface) of the catalyst carrier 11 and is made of conductive ceramic. The second underlayer 14 is arranged on the surface of the first underlayer 13. The second underlayer 14 is made of metal matrix and oxide mineral particles dispersed in the metal matrix. Examples of the metal matrix include NiCr alloy and MCrAlY alloy. The letter M indicates one or more of Fe, Co, and Ni. The oxide mineral particles are, for example, particles in which the main component is an oxide such as silica or alumina and which include bentonite or mica. The metal electrode plate 15 has a comb shape and is made of conductive metal such as Fe—Cr alloy. The metal electrode plate 15 is fixed to the surface of the second underlayer 14 by the fixing layer 16, which is made of the same material as the second underlayer 14. Each electrode unit 12 includes ends 12a and a middle 12b in the circumferential direction C. In the present embodiment, the first underlayer 13 includes the ends 12a of the electrode unit 12 in the circumferential direction C.

The electrically heated catalytic device 10 is capable of electrically heating the catalyst carrier 11. That is, by applying voltage to a section between the two electrode units 12 so as to energize the catalyst carrier 11, the heat generated through the energization heats the catalyst carrier 11. In a case where the electrically heated catalytic device 10 is coupled to an internal combustion engine, such electrical heating of the catalyst carrier 11 expedites the catalytic activity of the electrically heated catalytic device 10.

When the catalyst carrier 11 is electrically heated or receives heat from exhaust gas so that the temperature of the catalyst carrier 11 becomes high, a heat stress occurs in the catalyst carrier 11. When such a heat stress becomes excessively large, the catalyst carrier 11 may potentially become cracked. In the electrically heated catalytic device 10 of the present embodiment, the side surface of the catalyst carrier 11 includes slits 30 to 37 that mitigate a heat stress.

Slits 30 to 37 of Catalyst Carrier 11

The structures of the slits 30 to 37 of the catalyst carrier 11 will now be described. The side surface of the catalyst carrier 11 includes the slits 30 to 37 at intervals in the circumferential direction C. The slits 30 to 37 extend in the axial direction A from the front end 11a to the rear end 11b of the catalyst carrier 11. In the present embodiment, eight slits 30 to 37 are arranged. The slits 30 to 37 each have a rectangular cross-sectional shape. In the electrically heated catalytic device 10 of the present embodiment, the slits 30 to 37 have the same dimension and shape.

The slits 30 to 37 are arranged at the following positions. As shown in FIG. 1, the plane extending through the middle portion of each electrode unit 12 in the circumferential direction C and extending through the central axis O of the catalyst carrier 11 is referred to as the first plane P1. Further, the plane that extends through the central axis O of the catalyst carrier 11 and is orthogonal to the first plane P1 is referred to as the second plane P2. The electrically heated catalytic device 10 is symmetric with respect to the second flat surface P2. The slits 30 and 34 are arranged along the intersecting line of the side surface (outer circumferential surface) of the catalyst carrier 11 and the first plane P1. The slits 32 and 36 are arranged along the intersecting line of the side surface of the catalyst carrier 11 and the second plane P2. The remaining four slits 31, 33, 35, 37 are each arranged at an intermediate portion between adjacent ones of the slits 30, 32, 34, 36. The four slits 31, 33, 35, 37 are located in the vicinity of the ends 12a of the two electrode units 12 in the circumferential direction C.

Figure 3:
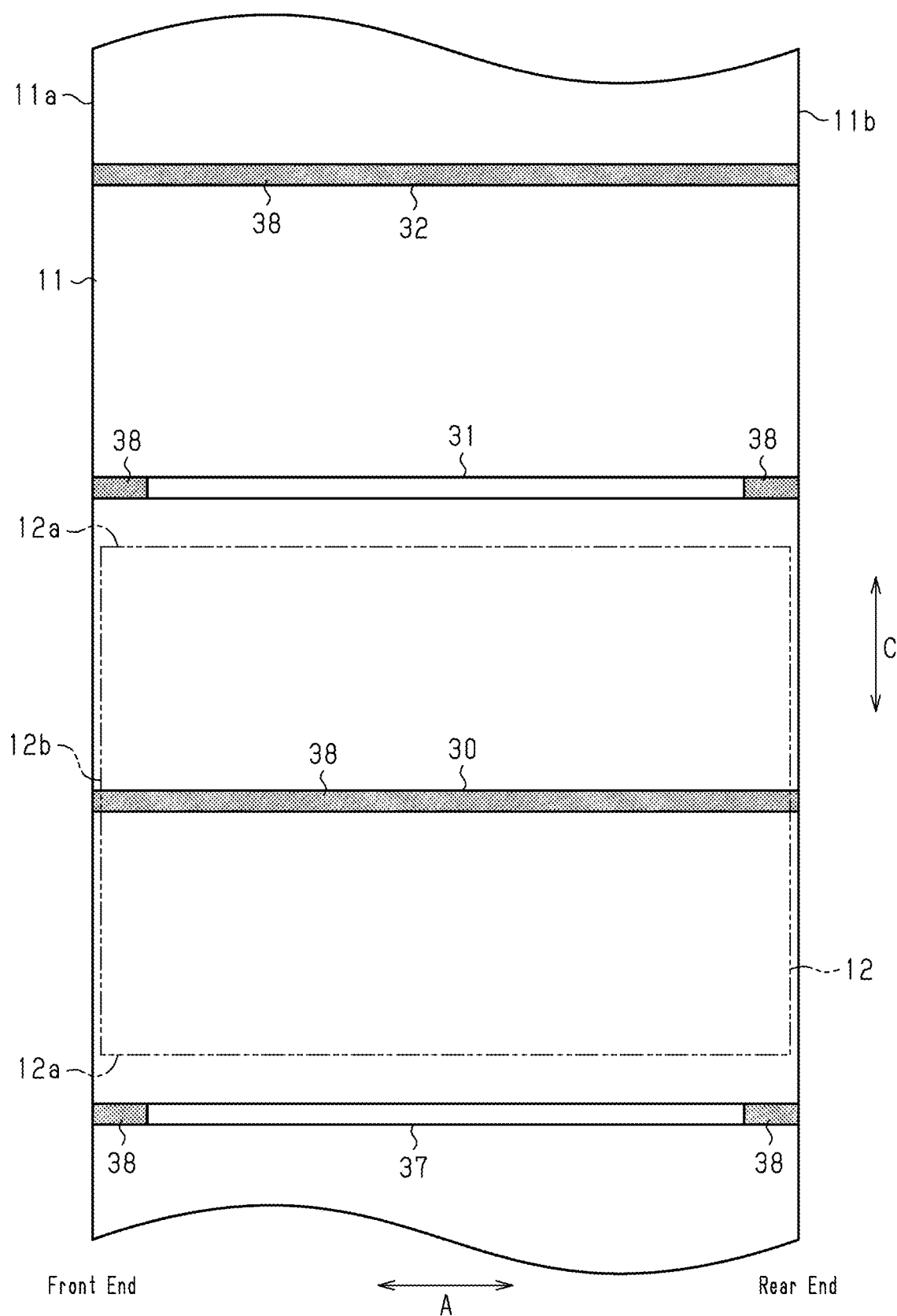
FIG. 3 is a developed view of the side surface of the catalyst carrier in the electrically heated catalytic device shown in FIG. 2.

FIG. 3 shows a developed structure of the half circumference of the side surface (outer circumferential surface) of the catalyst carrier 11. The slits 30 to 37 are each filled with a filler 38. The filler 38 has a lower Young's modulus than the base of the catalyst carrier 11. In the present embodiment, the filler 38 is a sintered body in which the main component is silicon and its oxide. The four slits 31, 33, 35, 37, which are arranged in the vicinity of the ends 12a (side edges) of the two electrode units 12 in the circumferential direction C, are each filled with the filler 38 only at the opposite ends of the slits 31, 33, 35, 37 in the axial direction A. The remaining four slits 30, 32, 34, 36 are each filled with the filler 38 over the entire length of each slit in the axial direction A. The slits 30, 32, 34, 36 filled with the filler 38 over the entire length are hereinafter referred to as the fully-filled slits. The slits 31, 33, 35, 37 filled with the filler 38 only at the opposite ends in the axial direction A are hereinafter referred to as the partly-filled slits. In each of the partly-filled slits 31, 33, 35, 37, the portion in the vicinity of the front end 11a and the portion in the vicinity of the rear end 11b of the catalyst carrier 11 are each filled with the filler 38. The intermediate portion of each of the partly-filled slits 31, 33, 35, 37 in the axial direction A is not filled with the filler 38.

Operation and Advantages of Present Embodiment

The operation and advantages of the present embodiment will now be described.

The electrically heated catalytic device 10 is coupled to the inside of the exhaust passage of an internal combustion engine. While the internal combustion engine is running, the temperature of the catalyst carrier 11 of the electrically heated catalytic device 10 becomes high when the catalyst carrier 11 is electrically heated or receives exhaust gas. In a state where the electrically heated catalytic device 10 is coupled to the inside of the exhaust passage of the internal combustion engine, thermal expansion of the catalyst carrier 11 resulting from the temperature increase is limited. This produces a heat stress in the catalyst carrier 11. In the electrically heated catalytic device 10 of the present embodiment, the side surface of the catalyst carrier 11 includes the slits 30 to 37 that mitigate the heat stress. The slits 30, 32, 34, 36 correspond to the fully-filled slits filled with the filler 38 over the entire length in the axial direction A. The remaining slits 31, 33, 35, 37 correspond to the partly-filled slits filled with the filler 38 only at the opposite ends in the axial direction A.

When the catalyst carrier 11 has a high temperature and thus tries to thermally expand, the fillers 38 in the slits 30 to 37 are compressed. The distortion of the filler 38 caused by the compression permits the catalyst carrier 11 to thermally expand in the circumferential direction C and thus mitigates the heat stress of the catalyst carrier 11. The mitigation amount of the heat stress increases as the distortion of the filler 38 relative to the compression increases, that is, as the Young's modulus of the filler 38 decreases. The partly-filled slits each include a portion that is not filled with the filler 38, that is, a portion where the Young's modulus of the filler 38 is likely to be 0. Thus, the partly-filled slits 31, 33, 35, 37 have a higher effect of mitigating the heat stress than the fully-filled slits 30, 32, 34, 36.

The heat stress occurring in the catalyst carrier 11 varies between different portions of the catalyst carrier 11 in the temperature distribution and the rigidity distribution in the catalyst carrier 11. The temperature distribution in the catalyst carrier 11 may be caused by the flow rate of exhaust gas flowing inside the catalyst carrier 11 while the internal combustion engine is running or by the variations in the temperature of exhaust gas between the portions of the catalyst carrier 11. The amount of heat generated by the catalyst carrier 11 when electrically heated varies between the portions of the catalyst carrier 11. This also results in the temperature distribution. Thus, during the electrical heating by the electrically heated catalytic device 10, variations in the heat stress tend to be large between the portions of the catalyst carrier 11.

Figure 4:
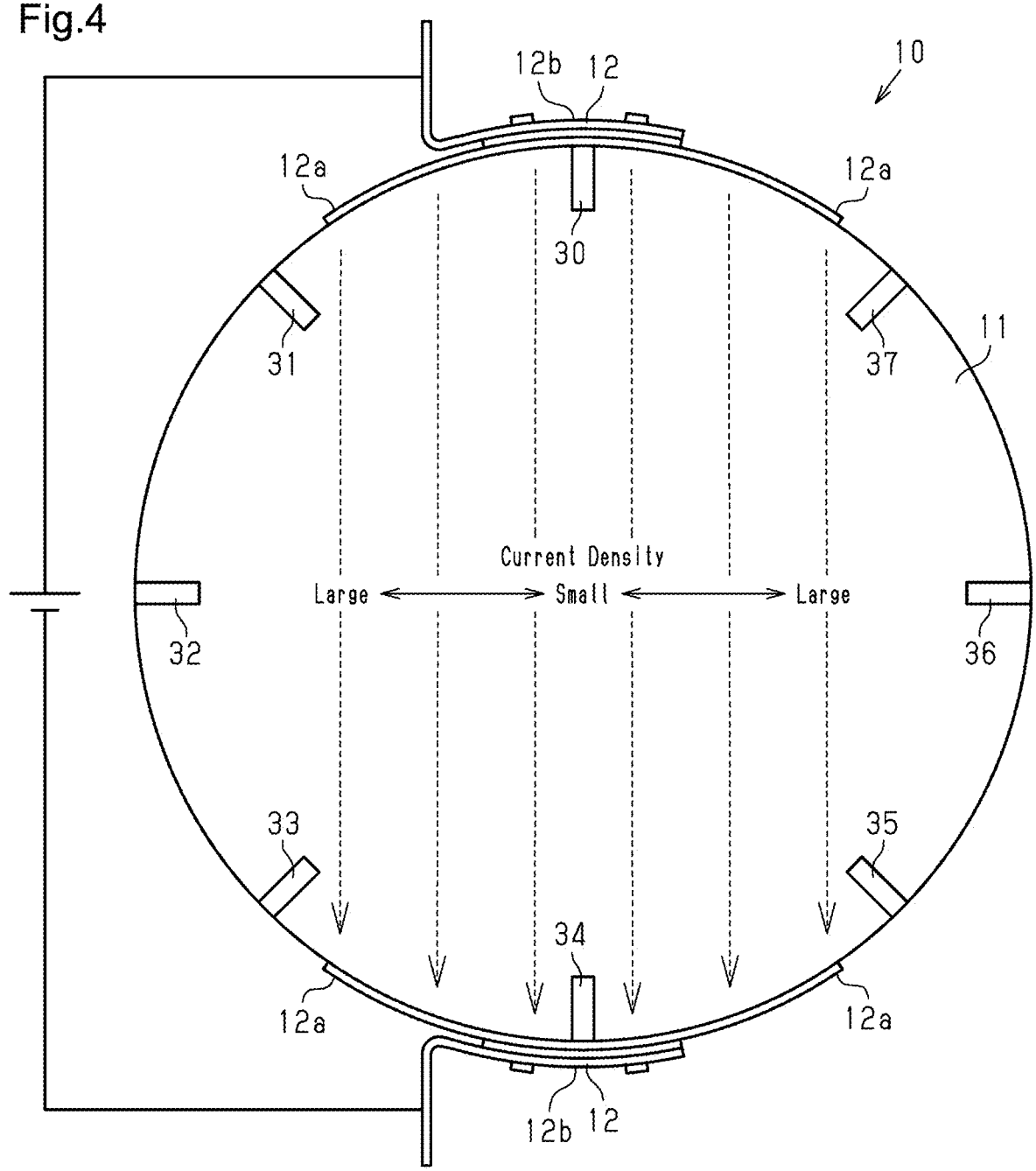
FIG. 4 is a diagram showing how current flows during energization in the electrically heated catalytic device shown in FIG. 2.

The temperature distribution and the heat stress distribution of the catalyst carrier 11 when electrically heated by the electrically heated catalytic device 10 of the present embodiment will now be described with reference to FIG. 4. FIG. 4 schematically shows the flow of current during the electrical heating by the electrically heated catalytic device 10 in the cross-section of the catalyst carrier 11, which is orthogonal to the central axis O. As described above, the two electrode units 12 are arranged at the positions of the side surface of the catalyst carrier 11 that are opposite from each other with respect to the central axis O. In the catalyst carrier 11 when electrically heated, current flows from one of the electrode units 12 toward the other electrode unit 12. As shown in FIG. 4, the length of a conductive passage between the electrode units 12 in the catalyst carrier 11 is longer at the middle 12b of each electrode unit 12 in the circumferential direction C than at the opposite ends 12a. The shorter the conductive passage, the smaller the electrical resistance and the higher current density. The higher the current density, the larger the amount of generated heat. Thus, portions of the side circumference of the catalyst carrier 11 in the vicinity of the opposite ends 12a of the electrode unit 12 in the circumferential direction C have a higher temperature than the other portions and thus easily have a high heat stress.

In the electrically heated catalytic device 10 of the present embodiment, the portions that easily have a high temperature include the partly-filled slits 31, 33, 35, 37. The partly-filled slits 31, 33, 35, 37 produce a high effect of mitigating the heat stress. This limits the generation of an excessive heat stress. If all of the slits 30 to 37 are the partly-filled slits, the rigidity of the catalyst carrier 11 decreases significantly. In the present embodiment, the slits 30, 32, 34, 36 other than the portions that easily have a high temperature are each filled with the filler 38 over the entire length. This limits a decrease in the rigidity of the catalyst carrier 11.

The electrically heated catalytic device 10 of the present embodiment provides the following advantages.

(1) The slits 31, 33, 35, 37 are arranged on the portions that easily have a high temperature. The slits 31, 33, 35, 37 are defined as the partly-filled slits that produce a high effect of mitigating a heat stress. The slits 30, 32, 34, 36 are arranged on the portions that do not easily have a high temperature. The slits 30, 32, 34, 36 are defined as the fully-filled slits that produce a lower effect of mitigating the heat stress than the partly-filled slits. Accordingly, the heat stress may be properly mitigated in correspondence with the temperature distribution of the catalyst carrier 11.

(2) The effect of mitigating the heat stress may also be increased by increasing the depth and width of each slit. However, an increase in the depth and width of each slit reduces the area where the catalyst carrier 11 purifies exhaust gas. In the present embodiment, the effect of the slits 31, 33, 35, 37 mitigating the heat stress is increased by limiting the filling range of the filler 38. This allows the heat stress of the catalyst carrier 11 to be mitigated without reducing the exhaust gas purification area.

Second Embodiment

The electrically heated catalytic device 10 according to a second embodiment will now be described in detail with reference to FIG. 5. In the present embodiment, the same reference numerals are given to those components that the same as the corresponding components of the above-described embodiment and detailed description thereof is omitted.

Figure 2:
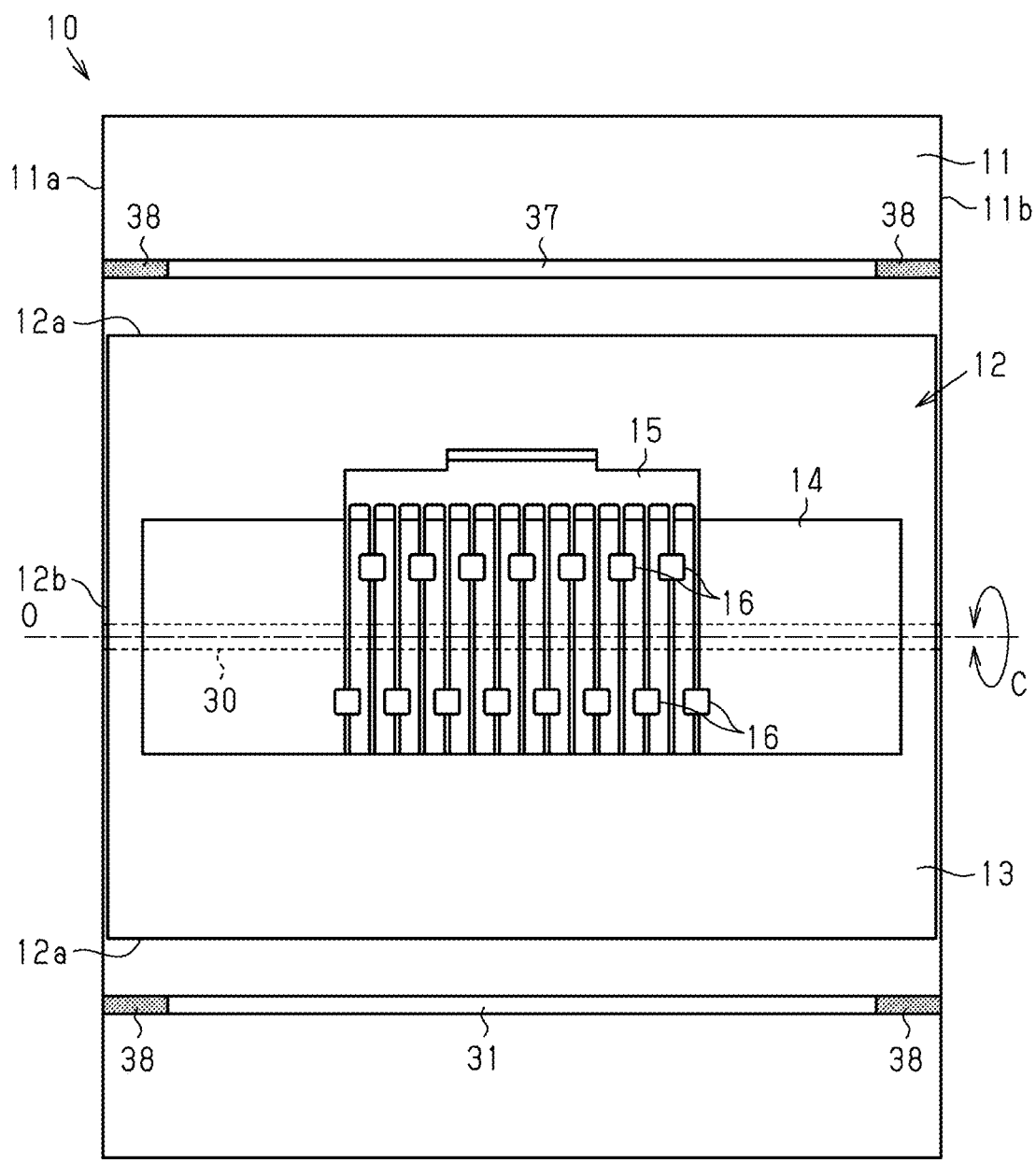
FIG. 2 is a side view of the electrically heated catalytic device shown in FIG. 1.

In the first embodiment shown in FIGS. 2 and 3, the filling range of the filler 38 is varied between the slits 31, 33, 35, 37, which are arranged at the portions that easily have a high temperature, and the slits 30, 32, 34, 36, which are arranged at other portions. The slits 31, 33, 35, 37 and the slits 30, 32, 34, 36 have the same Young's modulus of the filler 38. In the present embodiment, the Young's modulus of a filler with which a slit is filled is different between the slits 31, 33, 35, 37, which are arranged at the portions that easily have a high temperature, and the other slits 30, 32, 34, 36.

Figure 5:
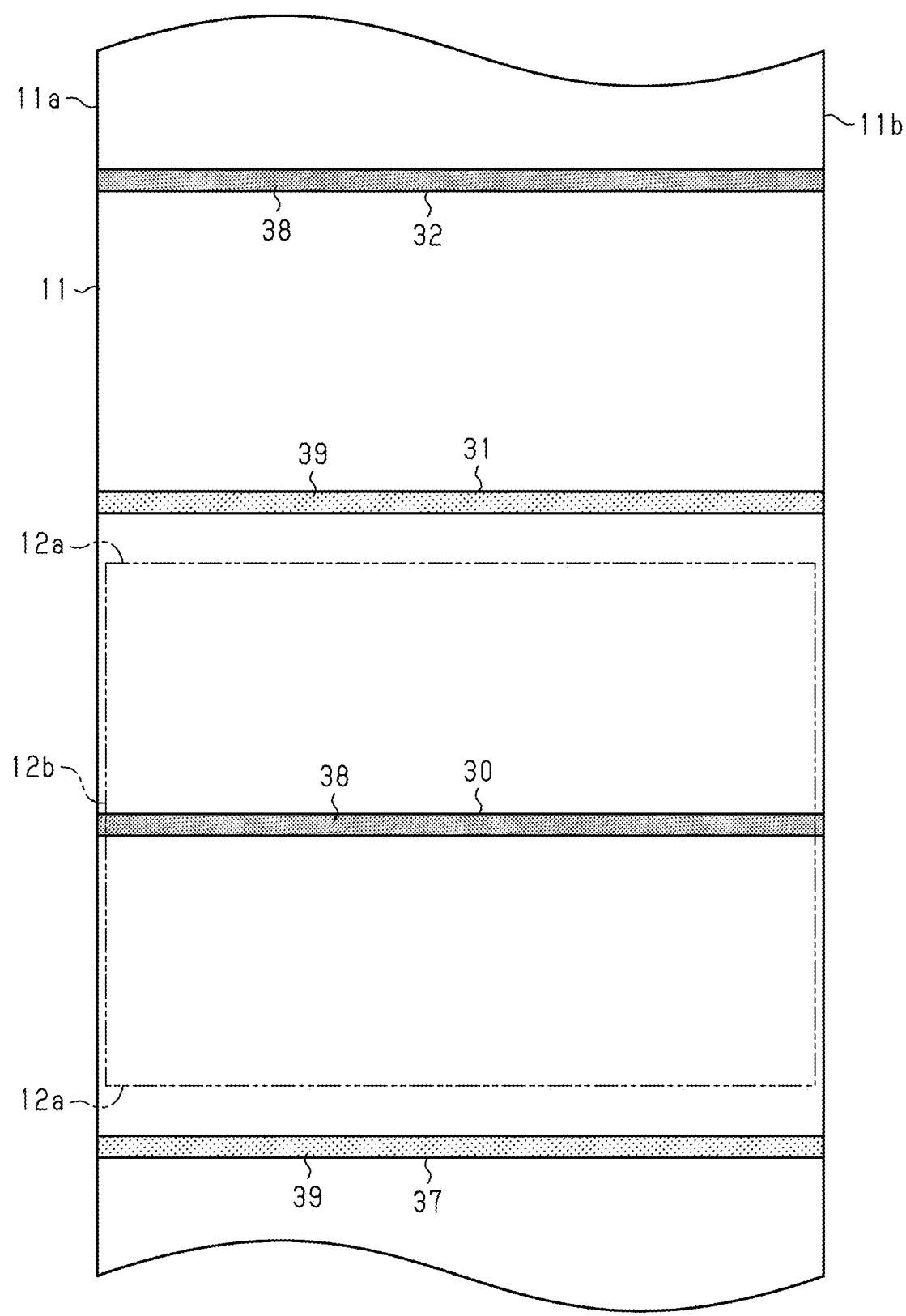
FIG. 5 is a developed view of the outer circumferential surface of the catalyst carrier in an electrically heated catalytic device according to a second embodiment.

FIG. 5 shows a developed structure of the half of the side surface of the catalyst carrier 11 in the electrically heated catalytic device of the present embodiment. In the range of FIG. 5, the slits 31, 33 are arranged at the portions of the catalyst carrier 11 that easily have a high temperature (e.g., arranged in the vicinity of the ends 12a of the electrode unit 12 in the circumferential direction C). The slits 32, 34 are arranged at the portions of the catalyst carrier 11 that do not easily have a high temperature (e.g., arranged in the vicinity of the middle 12b of the electrode unit 12 in the circumferential direction C). In the present embodiment, the slits 31, 33, 35, 37, which are arranged at the portions that easily have a high temperature, are each filled with a filler 39 having a lower Young's modulus than the filler 38, with which the other slits 30, 32, 34, 36 are filled. The slits 30, 32, 34, 36 filled with the high Young's modulus filler 38 (filler with a high Young's modulus) are hereinafter referred to as the high Young's modulus slits. Further, the slits 31, 33, 35, 37 filled with the low Young's modulus filler 39 (filler with a low Young's modulus) are hereinafter referred to as the low Young's modulus slits. A sintered body made of the same material is used for the fillers 38, 39. The Young's moduli of the two fillers 38, 39 are changed by adjusting the porosity of the sintered body.

When compressed, the low Young's modulus filler 39 is distorted to a larger extent than the high Young's modulus filler 38. Thus, the low Young's modulus slits 31, 33, 35, 37 have a higher effect of mitigating a heat stress than the high Young's modulus slits 30, 32, 34, 36. In the present embodiment, the slits 31, 33, 35, 37, which are arranged on the portions that easily have a high temperature, are defined as the low Young's modulus slits that produce a high effect of mitigating the heat stress. This limits the generation of an excessive heat stress.

The high Young's modulus filler 38 has a higher rigidity than the low Young's modulus filler 39. In the present embodiment, the slits 30, 32, 34, 36, which are arranged at the portions that do not easily have a high temperature, are filled with the high Young's modulus filler 38. Accordingly, as compared with when, for example, the slits 30 to 37 are all filled with the low Young's modulus filler 39, a decrease in the rigidity of the catalyst carrier 11 is limited in the present embodiment.

Relationship between Filler Filling Manner and Heat Stress Mitigation Effect

How the filler filling manner affects the effect of a slit mitigating a heat stress will now be described. When the catalyst carrier thermally expands, a compression stress is applied to a filler in a slit. The distortion of the filler relative to the compression stress permits an outer circumferential portion of the catalyst carrier to thermally expand in the circumferential direction. The larger the permitted amount of the thermal expansion in the catalyst carrier, the smaller the amount of the heat stress of the catalyst carrier. That is, the lower the Young's modulus of the filler, the smaller the amount of the heat stress of the catalyst carrier. In other words, as the permitted amount of the thermal expansion in the catalyst carrier increases, the amount of the heat stress of the catalyst carrier becomes much lower. As the Young's modulus of the filler becomes lower, the heat stress of the catalyst carrier becomes much lower. Thus, the Young's modulus of the filler is an indicator of the effect of mitigating the heat stress of the catalyst carrier.

In some cases, slits (e.g., the partly-filled slits 31, 33, 35, 37 in FIGS. 2 and 3) are each filled with a filler such that the Young's modulus of the filler is not fixed over the entire length of the slit. The index value of the effect of a slit, including a slit where the Young's modulus is not uniform, may be the following average Young's modulus. The average Young's modulus is a value obtained by averaging the Young's modulus of the filler at different portions of a slit over the entire length of the slit. In the averaging of the Young's modulus, the Young's modulus of a filler at a portion of a slit that is not filled with the filler is 0. This generally indicates that a slit filled with a filler having a low average Young's modulus provides a greater effect of mitigating the heat stress of the catalyst carrier than a slit filled with a filler having a high average Young's modulus.

Figure 6:
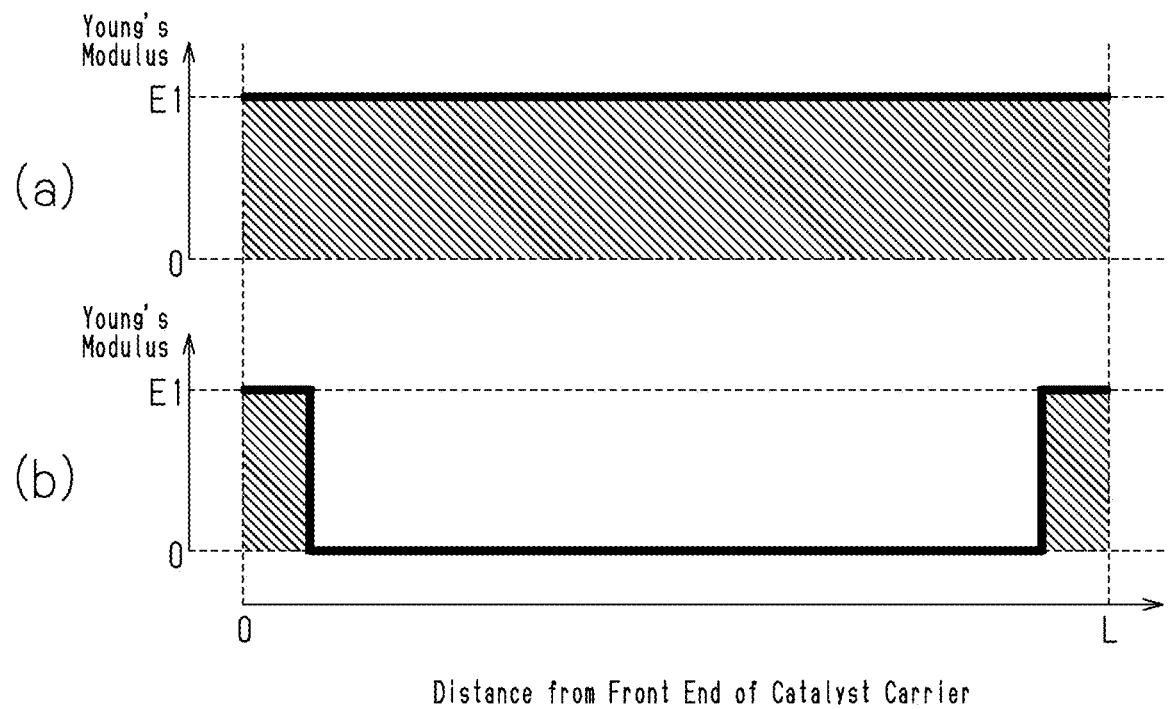
FIG. 6 is a graph including section (a) that shows the distribution of the Young's modulus of the filler of a fully-filled slit in the electrically heated catalytic device of the first embodiment in FIG. 2, and including section (b) that shows the distribution of the Young's modulus of the filler of a partly-filled slit in the electrically heated catalytic device of the first embodiment in FIG. 2.

Section (a) of FIG. 6 shows the Young's modulus of the filler 38 at each portion of the fully-filled slits 30, 32, 34, 36 in the first embodiment, which are shown in FIGS. 2 and 3, from the front end 11a to the rear end 11b of the catalyst carrier 11 in the axial direction A. Section (b) of FIG. 6 shows the Young's modulus of the filler 38 at each portion of the partly-filled slits 31, 33, 35, 37 in the first embodiment from the front end 11a to the rear end 11b of the catalyst carrier 11. E1 in FIG. 6 represents the Young's modulus of a sintered body used as the filler 38. L in FIG. 6 represents the length of the catalyst carrier 11 in the axial direction A (i.e., the entire length of the catalyst carrier 11). In the fully-filled slits 30, 32, 34, 36, which are equally filled with the filler 38 over the entire length of each slit, the Young's modulus of the filler 38 indicates a fixed value E1 over the entire length. The partly-filled slits 31, 33, 35, 37, which are filled with the filler 38 only at the opposite ends of each slit in the axial direction A, the Young's modulus of the filler 38 indicates 0 at portions other than the opposite ends. The average Young's modulus of each of the fully-filled slits 30, 32, 34, 36 and the partly-filled slits 31, 33, 35, 37 corresponds to the quotient obtained by dividing, by length L, the area of the hatched region in FIG. 6. As obvious from FIG. 6, the partly-filled slits 31, 33, 35, 37 shown in section (b) of FIG. 6 have a lower average Young's modulus than the fully-filled slits 30, 32, 34, 36 shown in section (a) of FIG. 6. In the first embodiment, the fully-filled slits 30, 32, 34, 36 each correspond to a first slit in which the average Young's modulus indicates a first value. Further, the partly-filled slits 31, 33, 35, 37 each correspond to a second slit in which the average Young's modulus indicates a second value. The second value is smaller than the first value.

Figure 7:
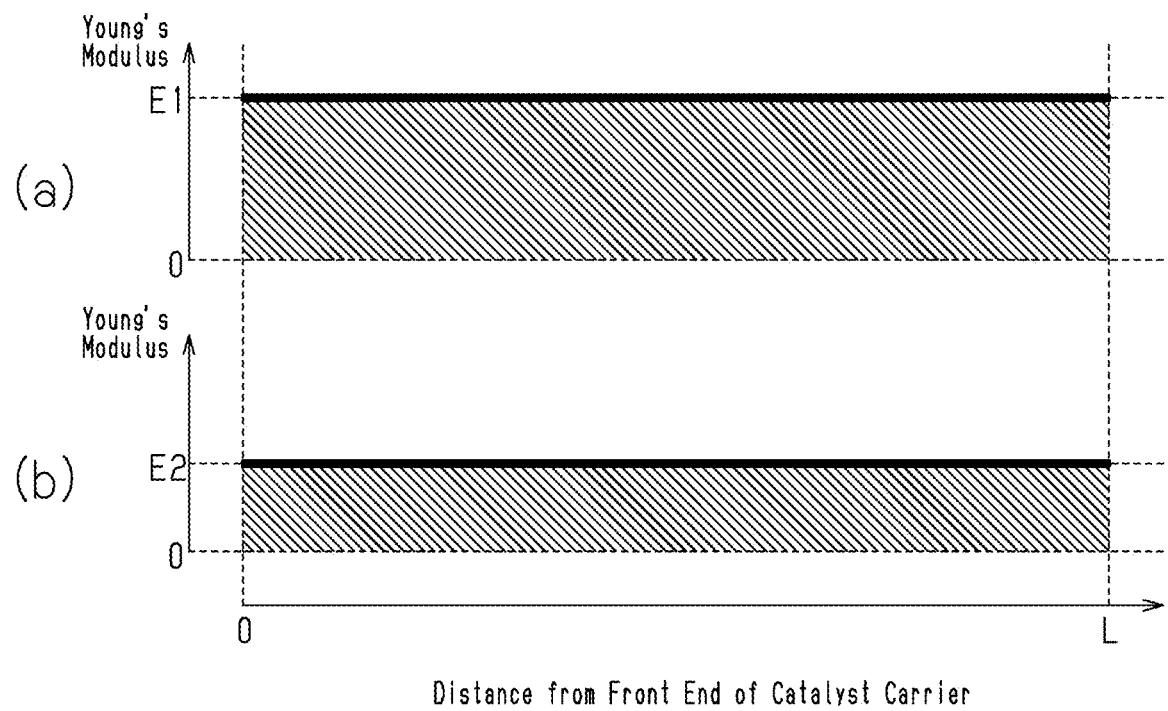
FIG. 7 is a graph including section (a) that shows the distribution of the Young's modulus of the filler of a high Young's modulus slit in the electrically heated catalytic device of the second embodiment in FIG. 5, and including section (b) that shows the distribution of Young's modulus of the filler of a low Young's modulus in the electrically heated catalytic device of the second embodiment in FIG. 5.

Section (a) of FIG. 7 shows the Young's modulus of the filler 38 at each portion of the high Young's modulus slits 30, 32, 34, 36 in the second embodiment, which are shown in FIG. 5, from the front end 11a to the rear end 11b of the catalyst carrier 11 in the axial direction A. Section (b) of FIG. 7 shows the Young's modulus of the filler 39 at each portion of the low Young's modulus slits 31, 33, 35, 37 in the second embodiment from the front end 11a to the rear end 11b of the catalyst carrier 11. E1 in FIG. 7 represents the Young's modulus of a sintered body used as the high Young's modulus filler 38. E2 represents the Young's modulus of a sintered body used as the low Young's modulus filler 39. The average Young's modulus of each of the high Young's modulus slits 30, 32, 34, 36 and the low Young's modulus slits 31, 33, 35, 37 corresponds to the quotient obtained by dividing, by length L, the area of the hatched region in FIG. 7. As obvious from FIG. 7, the low Young's modulus slits 31, 33, 35, 37 have a lower average Young's modulus than the high Young's modulus slits 30, 32, 34, 36. In the second embodiment, the high Young's modulus slits 30, 32, 34, 36 each correspond to the first slit in which the average Young's modulus indicates the first value. Further, the low Young's modulus slits 31, 33, 35, 37 each correspond to the second slit in which the average Young's modulus indicates the second value, which is smaller than the first value.

The above-described embodiment may be modified as follows. The present embodiment and the following modifications can be combined as long as they remain technically consistent with each other.

In the above-described embodiment, the temperature becomes high most likely at the portions of the side surface (outer circumferential surface) of the catalyst carrier 11 in the vicinity of the opposite ends 12a of each electrode unit 12 in the circumferential direction C. In some structures and arrangements of the electrode unit, the temperature becomes high most likely at another portion, such as a portion of the catalyst carrier 11 located immediately below the electrode unit. In such a case, the arrangement of the fully-filled slits or the high Young's modulus slits and the arrangement of the partly-filled slits or the low Young's modulus slits may be changed in correspondence with the temperature distribution of the catalyst carrier 11. More specifically, the slits arranged at portions that easily have a high temperature (e.g., the middle 12b of the electrode unit 12 in the circumferential direction) are used as the partly-filled slits or the low Young's modulus slits. Further, the slits arranged at another portion (e.g., each end 12a of the electrode unit 12 in the circumferential direction C) are used as the fully-filled slits or the high Young's modulus slits.

In the partly-filled slits 31, 33, 35, 37 of the first embodiment in FIG. 2 and section (b) of FIG. 7, the portion filled with the filler 38 may be changed. For example, a configuration may be employed in which the opposite ends of each of the partly-filled slits 31, 33, 35, 37 in the axial direction A are not filled with the filler 38 and only the middle portion of each of the partly-filled slits 31, 33, 35, 37 in the axial direction A (extending direction) are filled with the filler 38. Alternatively, the slits 30, 32, 34, 36, which are the fully-filled slits in the first embodiment in FIG. 2 and section (a) of FIG. 7, may partially include a portion that is not filled with the filler 38. The length of the portion of each of the slits 30, 32, 34, 36 that is filled with the filler 38 is greater than the length of each of the partly-filled slits 31, 33, 35, 37 that is filled with the filler 38. Even in such a case, the slits 30, 32, 34, 36 have a greater average Young's modulus than the partly-filled slits 31, 33, 35, 37.

The average Young's modulus of a slit is changed by changing the filling range of the filler 38 in the first embodiment of FIGS. 2 and 6 and by changing the Young's modulus of each of the fillers 38, 39 in the second embodiment of FIGS. 5 and 7. The average Young's modulus of a slit may be changed in another manner. For example, each of the portions of the partly-filled slits 31, 33, 35, 37 of the first embodiment that are not filled with the filler 38 is filled with the low Young's modulus filler 39, which has a lower Young's modulus than the other portions. Even in such a case, the second value indicating the average Young's modulus of the partly-filled slits 31, 33, 35, 37 is lower than the first value indicating the average Young's modulus of the fully-filled slits 30, 32, 34, 36.

The structure of the electrically heated catalytic device (including the number of slits arranged on the catalyst carrier 11 and the arrangement, structure, and the like of the electrode units 12) may be changed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electrically heated catalytic device, comprising:
   a cylindrical catalyst carrier; and
   two electrode units attached to a side surface of the catalyst carrier, wherein
   the side surface of the catalyst carrier includes slits each extending in an axial direction of the catalyst carrier,
   each of the slits is filled with a filler that has a lower Young's modulus than the catalyst carrier,
   an average Young's modulus is a value obtained by averaging the Young's modulus of the filler at different portions of the slit over an entire length of the slit in the axial direction, and
   the slits include a first slit and a second slit, the average Young's modulus of the first slit being a first value, and the average Young's modulus of the second slit being a second value that is smaller than the first value.

2. The electrically heated catalytic device according to claim 1, wherein a length of a portion of the first slit that is filled with the filler is greater than a length of a portion of the second slit that is filled with the filler.

3. The electrically heated catalytic device according to claim 1, wherein the second slit is filled with a filler that has a lower Young's modulus than a filler with which the first slit is filled.

4. The electrically heated catalytic device according to claim 1, wherein
   the filler is a sintered body, and
   the second slit is filled with a filler that has a greater porosity than a filler with which the first slit is filled.

5. The electrically heated catalytic device according to claim 1, wherein
   the electrode units each include an end in a circumferential direction of the catalyst carrier, and
   the second slit is located in a vicinity of the end of the electrode unit in the circumferential direction of the catalyst carrier.

6. A method for manufacturing an electrically heated catalytic device, the method comprising:
   preparing a cylindrical catalyst carrier;
   forming slits on a side surface of the catalyst carrier, the slits each extending in an axial direction of the catalyst carrier;
   filling each of the slits with a filler that has a lower Young's modulus than the catalyst carrier, an average Young's modulus being a value obtained by averaging the Young's modulus of the filler at different portions of the slit over an entire length of the slit in the axial direction; and
   attaching two electrode units to the side surface of the catalyst carrier,
   wherein filling each of the slits with the filler includes:
   filling a first slit of the slits with a filler such that the average Young's modulus is a first value; and
   filling a second slit of the slits with a filler such that the average Young's modulus is a second value, the second value being smaller than the first value.

* * * * *